United States Patent
Honda

(10) Patent No.: US 6,591,396 B1
(45) Date of Patent: Jul. 8, 2003

(54) MOVING IMAGE COMMUNICATION QUALITY DETERMINATION APPARATUS

(75) Inventor: Yoshizou Honda, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/577,096

(22) Filed: May 24, 2000

(30) Foreign Application Priority Data

May 31, 1999 (JP) ............................................ 11-153078

(51) Int. Cl.⁷ ................................................ G06F 11/06
(52) U.S. Cl. ........................................ 714/798; 714/755
(58) Field of Search ........................... 382/7, 112, 309; 250/556; 364/507; 714/798, 755

(56) References Cited

U.S. PATENT DOCUMENTS

| | | | |
|---|---|---|---|
| 4,888,812 A | * 12/1989 | Dinan et al. | 382/7 |
| 5,149,977 A | * 9/1992 | Mita | 250/556 |
| 5,687,250 A | * 11/1997 | Curley et al. | 382/112 |
| 5,793,647 A | * 8/1998 | Hageniers et al. | 364/507 |
| 6,115,509 A | * 9/2000 | Yeskel | 382/309 |

FOREIGN PATENT DOCUMENTS

| | | |
|---|---|---|
| JP | 07-322248 | 12/1995 |
| JP | 08-223610 | 8/1996 |
| JP | 08-251596 | 9/1996 |
| JP | 11-252570 | 9/1999 |

* cited by examiner

Primary Examiner—David Ton
(74) Attorney, Agent, or Firm—Fish & Richardson P.C.

(57) ABSTRACT

A transmitter 12 and a receiver 35 are connected to a network 20 for transferring data of moving image code as a packet between the transmitter 12 and the receiver 35. The transmitter 12 prepares a packet of moving image code from moving image data and outputs the packet to the network 20. In the receiver 35, a moving image reception section 31 receives a packet 61 input via the network 20, extracts the data bits of the moving image code sandwiched between synchronous codes from the received packet 61, and outputs the extracted bits of the moving image code to a moving image decoder 30. The moving image decoder 30 decodes the input moving image code into a digital moving image and outputs the provided digital moving image to a display 33, which then displays the input digital moving image on a display screen.

22 Claims, 4 Drawing Sheets

TIME T

AREA A

AREA B

TIME T + Δt

AREA A

AREA B

MOVING IMAGE COMMUNICATION QUALITY DETERMINATION APPARATUS

BACKGROUND OF THE INVENTION

1. Field of the Invention

This invention relates to a moving image communication quality determination apparatus and in particular to a moving image communication quality determination apparatus for evaluating the quality of a digital image in digital moving image communications.

2. Description of the Related Art

The international standards for digital moving image code (simply, moving image code) include MPEG (Motion Picture Expert Group)-2 (ISO/IEC-13818) and MPEG-4 (ISO/IEC-14496) by ISO (International Organization for Standardization) and IEC (International Electrotechnical Commission) of international standardization organizations and H.261, H.263, etc., of ITU (International Telecommunication Union) Recommendations, for example. In the description to follow, unless otherwise specified, the moving image code refers to a moving image code conforming to the above-mentioned international standards. Alternatively, it is also applied to the moving image code based on a prediction coding technique used in the above-mentioned international standards.

For example, the main portion of "Douga tuushin souchi (moving image communication apparatus)" of Japanese Patent Application No. Hei 10-052531 by the present inventor (an example in a related art) corresponds to a moving image communication quality determination apparatus for evaluating the quality in communication using such moving image code. The corresponding portion relevant to the description of the invention will be briefly discussed for easy comparison with the configuration of the apparatus of the invention.

FIG. 4 is a block diagram to show a configuration example of an image processing system containing a moving image communication analysis apparatus according to the example in the related art. A transmitter 112 and a receiver 135 are connected to a network 20 for transferring digital moving image code (simply, moving image code) in real time. In the transmitter 112, a moving image encoder 110 prepares moving image code and outputs the prepared moving image code to the network 20 through a moving image transmission section 111. In the receiver 135, a moving image reception section 131 receives input moving image code and outputs the received moving image code to a moving image decoder 130. The moving image decoder 130 decodes the input image code and outputs the provided digital moving image to a display 133. The display 133 displays the input digital moving image on a display screen.

The quality of the provided digital image displayed on the display 133 from the transmitter 112 is degraded because of the following causes:

First, the causes of degradation of the image quality include a transmission error of data of moving image code, packet discard in a transmission packet group, a transmission delay of data of moving image code, fluctuation of the delay, and the like.

Next, the degradation of the image quality spreads or a fault in the moving image decoder 130 occurs and a processing failure occurs in decode processing of the moving image code. Further, the processing failure in the decode processing spreads or a fault in the display 133 occurs and display processing of the digital moving image displayed on the display screen of the display 133 may become faulty.

To maintain and improve the quality of the transmitted moving image code, it is important to evaluate degradation of the quality of a digital moving image as described above. Then, the receiver 135 comprises a code data section 132 for collecting received moving image code. A moving image communication analysis apparatus 40 is connected to the network 20 and detects degradation of the moving image code transferred in the network 20. The code data section 132 transfers with no error the collected moving image code to the moving image communication analysis apparatus 40 via the network 20. The term "transfer with no error" mentioned here refers to a method of detecting a transmission error and executing resending, etc., for transmitting data with no transmission error as a result.

The moving image communication analysis apparatus 40 outputs the input moving image code to a collected code section 402. The collected code section 402 stores the input moving image code therein. A decoding section 404 restores the moving image code stored in the collected code section 402 to the received digital moving image and outputs the provided digital moving image to a degradation component section 405.

On the other hand, the transmitter 112 transfers with no error the same moving image code held in the moving image encoder 110 as the moving image code transmitted in real time to the moving image communication analysis apparatus 40 via the network 20. The term "transfer with no error" refers to processing as described above. The same moving image code as the moving image code transmitted in real time, input to the moving image communication analysis apparatus 40 is output to an original image code section 401. The original image code section 401 stores the input moving image code therein. A decode section 403 restores the moving image code stored in the original image code section 401 to the pre-transmitted digital moving image and outputs the provided moving image restoration value (provided moving image) to the degradation component section 405.

The degradation component section 405 calculates a difference image having as new gradation values of the digital moving image the values resulting from subtracting the gradation values of pixels of the pre-transmitted digital moving image from those of the corresponding pixels of the received digital moving image. Further, in an example showing a degradation component, the sum of the squares of all pixels of the difference image is calculated, the sum of the squares of all pixels of the pre-transmitted digital moving image is calculated, and the ratio between the square sums is found and is output as a kind of parameter representing the image quality, namely, SNR (signal to noise ratio).

Next, remedies to deal with an anomaly of moving image code and an anomaly of a display in related arts to be compared with the invention will be discussed. If the moving image code input to the moving image decoder contains an anomaly, an anomaly occurs in the provided moving image, as described above. A large number of arts of using means for detecting an anomaly of moving image code for transmission and processing of the moving image code are well known.

"Dougazou fugouka/fukugouka souchi" (moving image coding/decoding apparatus) of JP-A-8-251596 by KIKUCHI Yoshihiro (kabushikikaisha Toshiba) et al. shows a processing example of detecting an anomaly from the decode value of a moving image and the range that the decode value can take. "Dougazou data no densou houhou oyobi densou souchi" (moving image data transmission method and transmission apparatus) of JP-A-7-322248 by SHINODA Mayumi (Matushita denki sangyou kabushikikaisha) et al. shows an example of detecting an anomaly of moving image code and again making a transmission request for resending the moving image code, thereby decreasing anomalies of the transmitted moving image code.

Next, anomalies occurring in moving image code transmitted via a network will be discussed in detail. First, as one of the anomalies occurring in moving image code, when an agreement of conforming to each standard as described above is made, the moving image code may contain code out of standard because of a transmission error of the moving image code, a failure of a moving image encoder, etc. If the code portion out of standard is input to a moving image decoder, the moving image decoder stops decoding the code out of standard and performs the preparation operation for detecting another normal code, then restarts decoding the normal code in the moving image code.

The decode operation of the moving image decoder will be discussed in detail with reference to FIGS. 5A and 5B, which are conceptual drawings to show the format of moving image code. As shown here, moving image code 61 is a string of bits concatenated in series in the bit order. While the moving image code 61 is read one bit at a time in the bit order, it is decoded. The current read bit is pointed to by a code pointer 62. As the decoding advances, the code pointer 62 advances on the moving image code 61. As shown in FIG. 5A, anomalous code 99 exists at one point of the moving image code 61 and when the code pointer 62 encounters the anomalous code 99, an anomaly is detected.

Since the decode value of the bits following the anomalous code is not reliable, the code pointer 62 searches the bits following the anomalous code for only predetermined synchronous code in order. As shown in FIG. 5B, synchronous code 63 exists at another point of the moving image code 61 and then the code pointer 63 encounters the synchronous code 63. At this time, the bits from the anomalous code 99 to the synchronous code 63 are all discarded and are not decoded into digital moving image. Numeral 64 denotes the discarded bits.

However, the duration required for the preparation operation until the decoding is restarted after the anomalous code is detected is not constant because of the processing timing difference in the circuitry implemented as the moving image decoder. Therefore, moving image codes input one after another by the time the decoding is restarted are not decoded and the portion of the moving image corresponding to the moving image code not decoded is lost. Further, the magnitude of the loss caused by the moving image code not decoded depends on the position of the synchronous code and therefore is not constant. The case where decoding can be restarted at the bit following the detection point of anomalous code out of standard, namely, the case where code other than code out of standard can be decoded also occurs.

Next, for example, the portion of code detected as an error based on error correction code or error checking code because of a transmission error of moving image code on a network, such as a packet, is discarded and thus a part of the moving image code is lost. The portion of the moving image corresponding to the lost code portion cannot be decoded. When the error is recovered from as described above and the subsequent code is input to the moving image decoder, some code is not decoded and the portion of the moving image corresponding the code not decoded is lost.

To produce moving image display at the same time as decoding, a coded time stamp is decoded and is collated with the time information at the point in time and if the decoding and display are not in time for the timing, display output is omitted or the corresponding code portion is discarded and is not decoded. When a packet not received within a predetermined time and delayed because of resending the packet with an error detected or network congestion or for any other reason is input to a moving image decoder, it is not in time for the display timing and an undecoded code portion occurs.

On the other hand, display anomalies occur in addition to decoding anomalies. Here, assume that pixel data by frame of a moving image provided by decoding is input to a display. If the input moving image provided by decoding is not in time for the timing at which it is to be displayed on the display, the frames before the frame in time for the display timing are discarded, namely, are not displayed.

Arts of detecting moving image code anomalies as described above are well known and are used to make a specific treatment on the moving image or resend the code.

As described above, the moving image communication quality determination apparatus in the related art finds a difference image between the original image and the degraded image on which an evaluation is to be conducted, regards the difference image as a degradation component, and uses the ratio of the square sum of the degradation component as the evaluation value of the image quality as SNR in the example.

The reason why the original image is required is that if the moving image, for example, is a rough pattern, contains a drawing like moth-eaten marks, or is an image of a contorted human face, it may be original, thus generally it is impossible to calculate a degradation component only from the degraded image. However, the method of finding a difference between the digital image provided by decoding and the original image (pre-transmitted digital image) would provide a degradation component from the original image easily and reliably.

However, the above-described method of finding a difference between the pre-transmitted and received digital images involves the following two problems in the point of data communication costs:

The first problem is the apparatus required for acquiring original image data and costs. The computer used with the moving image communication analysis apparatus in the example in the related art needs to acquire original images from a computer having a mechanism for retaining original image data, as typified by a moving image server.

Moving image data generally has an enormous information amount and transferring the moving image data between computers requires a transmission line for connecting the computers and a transfer apparatus using the transmission line. Further, for example, if use of the transmission line is chargeable and the user is charged for using the transmission line according to the use time or the communication data amount, administration costs are increased in any case.

In "Douga tuushin souchi" of Japanese Patent Application No. Hei 10-052531 in the example in the related art, moving image code provided by coding original image data is reliably transferred from a moving image server to a computer for calculating an image quality evaluation value. Since the information amount of the moving image code is from about one third to fifth to one thirtieth to fiftieth less than that of the original image data, the communication costs can be decreased reasonably. However, the transmission line for transferring data between computers and the transfer apparatus for transferring data between computers do not become unnecessary.

The second problem is communication costs for acquiring the moving image code of the degraded image on which an evaluation is to be conducted. In "Douga tuushin souchi" of Japanese Patent Application No. Hei 10-052531 described above, moving image code is collected at a moving image reception terminal and is reliably transferred as data to a computer for calculating an image quality evaluation value. Since the loads of the operation amount and the processing amount on the moving image reception terminal are not increased, it is easy to conduct an evaluation at a comparatively small portable terminal on which many limitations of the physical size, the weight, the power consumption amount, etc., are imposed; this is a good point. However, since the collected moving image code is transferred as data, the communication cost for transferring the data of the moving image code having the same degree of information amount as the original moving image code is required.

The problems to be solved as the related art in "Douga tuushin souchi" of Japanese Patent Application No. Hei 10-052531 have been described.

On the other hand, according to "Gazou tensou hyouka souchi" (image transfer evaluation apparatus) of JP-A-8-22360 by BASUGI Masao (NTT) et al., a method of returning moving image code to a transmission terminal transmitting the moving image code via a specific point of a network of the moving image transmission destination is adopted. Thus, transfer of the original image data and transfer of the once received image data on which an evaluation is to be conducted become unnecessary. However, the quality of the moving image transmitted to and returned from the destination and the quality of the moving image transmitted on the one-way line to the actual reception terminal used by the user differ in the state of transmission error, transmission delay, packet discard, etc., a difference occurs in degradation of the moving image quality; the moving image quality enjoyed by the user from a display cannot actually be evaluated.

A large number of examples of instruments for measuring a packet delay transmitting moving image data, variation of the packet delay, packet discard rate, packet resending rate, packet error rate, bit error rate, etc., which will be hereinafter referred to as transmission characteristic measuring instruments, have been well known. To use the measuring instruments for measuring the degree of degradation of the image quality to evaluate real-time moving image communication, the original image or comparison image is not required, of course. However, the degradation degree as an image cannot be known; this is a problem.

Where degradation of the image quality as an image is concerned, the above-described prediction coding technique is used heavily in the transmission and reception operation of moving image code, whereby as reference values and referenced values increase, a reference value anomaly will spread. Thus, to suppress the effect of an error in moving image code, a method of avoiding heavy use of the prediction coding technique in the transmission and reception operation of the moving image code is available.

When an anomaly occurs in the code portion of important information of the image size, the format, etc., the moving image code cannot be restored to an image even if other codes are normal.

Thus, the important information of the image size, the format, etc., is scattered appropriately on the code string and if code at a specific point is anomalous, an error correction may be made using code at any other normal point or the value may be replaced. It is necessary to evaluate the degradation degree of the image quality relative to an error in transmission of moving image code or a loss of image code. However, the transmission characteristic measuring instrument cannot evaluate the degradation degree of the image quality relative to an error in transmission of moving image code or a loss of image code; this is a problem.

By the way, in "Dougazou fugouka/fukugouka souchi" of JP-A-8-251596 described above, an anomaly of moving image code is detected and decoding processing is changed, whereby degradation of the image quality is decreased. In "Dougazou data no densou houhou oyobi densou souchi" of JP-A-7-322248, an anomaly of moving image code is detected and again a request for transmitting the image code with the error detected is made for resending the moving image code, whereby spread of degradation of the moving image code is decreased.

It is necessary to perform processing so that degradation detection of moving image code is in time for the display operation while the real-time communication, decoding, and display operation is performed by changing decoding processing for the moving image code, resending the moving image code with degradation detected, etc. Thus, margins are required for the time conditions of the amount of data that can be transferred per unit time, the computer processing speed, etc. For example, as a larger number of errors occur, additional processing is increased or resending the image code with degradation detected is increased. Therefore, the actual moving image code processing amount is lessened or the transmission amount of the image code transmitted per unit time is decreased as compared with the processing or transmission amount of a moving image that can be transferred with no error.

To previously code and store a moving image, read the moving image code at the transmission time, and transmit the read moving image code at the same time, it is necessary to appropriately select parameters of the coding rate, coding parameter, coding mode, etc., at the moving image coding time and code them according to the error degree. However, in the methods shown in JP-A-8-251596 and JP-A-7-322248, the parameters at the moving image coding time vary depending on the error degree in moving image code, thus guidelines for the values of the parameters are not provided.

The coding rate refers to the amount of the moving image code transmitted per unit time in real-time transmission. Where the international standards for moving image code are concerned, the coding parameter and the coding mode specify coding conditions of moving image data. That is, for example, the coding parameter and the coding mode are the number of vertical and horizontal pixels of a screen (also called image size), the number of intensity pixels and the number of color difference pixels (also called color difference format), the number of frames per unit time (also called frame rate), coarseness of quantization, the type of interframe prediction coding technique (order of frames taking the prediction type I, P, B, etc., in MPEG), the type of any other prediction coding technique (motion vector prediction, DC/AC coefficient prediction, etc., in MPEG), etc.

The prediction types I, P, and B are the interframe prediction coding technique types and more than one time prediction mode can be selected. That is, in the interframe prediction coding technique, the moving image coding technique called prediction mode (I mode) not executing prediction based on the correlation between frames, bi-directional prediction mode (B mode), or unidirectional prediction mode (P mode) is selected for use in moving image frames. The "I" of the I mode denotes "intra prediction," the "B" of the B mode denotes "bidirectional prediction," and the "P" of the P mode denotes simply prediction. Therefore, in an encoder and a decoder conforming to one of the above-described standards, the I, P, or B mode is also selected for use in communication.

Generally, use of the B mode even for a part of a moving image requires a large processing scale, thus some machines have only the P mode function or if the B mode is selected, the P mode is used for a part of a moving image and the B mode is used for another part of the moving image. Conversely, if the P mode is selected, often the B mode is not used at all. Throughout the specification, "selection of P mode" refers to the case where the B mode is not used and "selection of B mode" refers to use of the P and B modes in combination.

For simplicity throughout the specification, the moving image coding technique is also used in the sense also containing selection and use of one value from among different parameters. For example, in the above-mentioned standards and recommendations, a quantization coefficient is selected from within one range of integer values. The value is used as the quantization coefficient and coding is executed, thus the moving image coding technique is contained in the sense indicating one of the moving image coding technique options.

Next, the proper use of the moving image code mode types will be discussed. Which moving image coding technique is optimum in moving image communications varies depending on the use purpose and the use situation.

The B mode has a feature of high coding efficiency and requiring a small code amount; on the other hand, the P mode has a feature of a short decode processing delay time. The code difference amount between the B and P modes varies depending on the picture material and a general tendency will be discussed. For example, the P mode with a small decode delay amount is effective for an application such as a video conference in many cases and the B mode with a small code amount may be effective for an application where the decode delay amount is allowable.

To code image data assuming that statistical relationship between portions of moving image data, the prediction coding technique is a method of coding the difference between a prediction value calculated by a calculation method determined using already coded image data and the actual value of the image data to be coded. The difference between the calculated prediction value and the actual value of the image data to be coded is also called prediction residual. The data used to calculate the prediction value is also called reference value. At this time, if the statistical nature of the image data is close to the assumed one, the prediction residual often becomes a value close to zero.

Therefore, short codes increase and it is made possible to compress the code amount. However, if the reference values are often used, when the reference value contains an error, the value of the digital image provided by decoding the image code also becomes erroneous, thus the error easily spreads. Therefore, to optimally select coding conditions, a method of finding the coding conditions applied when the quality of each received, decoded, displayed moving image is good in a state close to the actual characteristics as much as possible becomes necessary.

As described above, in the decode processing change method and the method of resending a part of the moving image code, whether or not the correspondence between the coding condition and the moving image quality under the coding condition is adequate is not known. That is, a problem of necessity for obtaining the knowledge of the correspondence between the coding condition and the moving image quality is involved.

The aforementioned problems have been raised in the related art of "Dougazou fugouka/fukugouka souchi" of JP-A-8-251596 and "Dougazou data no densou houhou oyobi densou souchi" of JP-A-7-322248.

SUMMARY OF THE INVENTION

It is therefore an object of the invention to provide a moving image communication quality determination apparatus that can evaluate the quality of a moving image input to a receiver via a network from a transmitter in the field without transferring image data of an original image or moving image code.

According to a first aspect of the present invention, there is provided, in a moving image communication system comprising a network and a moving image server connected to the network wherein the moving image server transmits digital moving image code via the network, a moving image quality evaluation determination apparatus comprising means being connected to the network for receiving the digital moving image code, means being connected to the network for detecting an anomaly of the digital moving image code, and image quality evaluation value calculation means being connected to the network for calculating the degree of quality degradation in a digital moving image caused by the detected anomaly.

According to a second aspect of the present invention, in the moving image quality evaluation determination apparatus, the receiving means comprises means for decoding a portion of the digital moving image code not containing the detected anomaly into a digital moving image.

According to a third aspect of the present invention, in the moving image quality evaluation determination apparatus, the anomaly detecting means detects a transmission error of the digital moving image code in the network and discard of the digital moving image code as the anomaly of the digital moving image code.

According to a fourth aspect of the present invention, in the moving image quality evaluation determination apparatus, the anomaly detecting means detects a transmission time delay of the digital moving image code in the network as the anomaly of the digital moving image code.

According to a fifth aspect of the present invention, in the moving image quality evaluation determination apparatus, the anomaly detecting means detects the fact that the digital moving image code to be decoded by the means for decoding the code into a digital moving image is not predetermined digital moving image code as the anomaly of the digital moving image code.

According to a sixth aspect of the present invention, in the moving image quality evaluation determination apparatus, when in decoding a specific part of the digital moving image code, the decode value of a different portion is referenced, the anomaly detecting means detects an anomaly of the decode value of the different part spreading to the decode value of the specific part of the digital moving image code as the anomaly of the digital moving image code.

According to a seventh aspect of the present invention, the moving image quality evaluation determination apparatus further includes means for locating an image area corresponding to the detected anomaly in the digital moving image, wherein the image quality evaluation value calculation means outputs the size of the anomalous image area or a size ratio of the anomalous image area to the whole as the calculation result.

According to an eighth aspect of the present invention, in the moving image quality evaluation determination apparatus, the image quality evaluation value calculation means calculates the size of the anomalous image area or a size ratio of the anomalous image area to the whole in pixel units of the digital moving image.

According to a ninth aspect of the present invention, in the moving image quality evaluation determination apparatus, the image quality evaluation value calculation means calculates the size of the anomalous image area or a size ratio of the anomalous image area to the whole in units of small areas into which a screen is divided in a specific range.

According to a tenth aspect of the present invention, in the moving image quality evaluation determination apparatus, the image quality evaluation value calculation means calculates the size of the anomalous image area or a size ratio of the anomalous image area to the whole in displayed frame units.

According to an eleventh aspect of the present invention, in the moving image quality evaluation determination apparatus, the image quality evaluation value calculation means sets the gradation value of the anomalous image area detected by the means for locating an image area corresponding to the detected anomaly in the digital moving image to zero, calculates a first square sum of the gradation value of the anomalous image area and a second square sum of the gradation values of the whole, calculates a ratio between the first and second square sums, and outputs the calculation result as an image evaluation value.

According to a twelfth aspect of the present invention, in the moving image quality evaluation determination apparatus, the image quality evaluation value calculation means corrects by concealment the gradation value of the anomalous image area detected by the means for locating an image area corresponding to the detected anomaly in the digital moving image, calculates a first square sum of the gradation value of the anomalous image area corrected and a second square sum of the gradation values of the whole, calculates a ratio between the first and second square sums, and outputs the calculation result as an image evaluation value.

According to a thirteenth aspect of the present invention, in the moving image quality evaluation determination apparatus, when in decoding a specific part of the digital moving image code, the decode value of a different portion is referenced, the anomaly detecting means detects an anomaly of the decode value of the different part spreading to the decode value of the specific part of the digital moving image code based on the code corresponding to the detected anomaly and the means for locating an image area corresponding to the detected anomaly in the digital moving image locates the image area containing the specific part of the digital moving image code corresponding to the spreading anomaly.

According to a fourteenth aspect of the present invention, in the moving image quality evaluation determination apparatus, the means for locating an image area corresponding to the detected anomaly in the digital moving image comprises a storage section allocated in a fixed length of one bit or more per pixel and records the anomalous area in the storage section.

According to a fifteenth aspect of the present invention, in the moving image quality evaluation determination apparatus, the means for locating an image area corresponding to the detected anomaly in the digital moving image comprises a storage section allocated in a fixed length of one bit or more per small area into which a display screen is previously divided and records the anomalous area in the storage section.

According to a sixteenth aspect of the present invention, in the moving image quality evaluation determination apparatus, the means for locating an image area corresponding to the detected anomaly in the digital moving image specifies a rectangular area on a display screen and records maximum and minimum values of column and row numbers of the rectangular area on the display screen.

According to a seventeenth aspect of the present invention, in the moving image quality evaluation determination apparatus, the means for detecting an anomaly of the digital moving image code is a decoder and the decoder detects input digital moving image code being undecodable, outputs an error at the detection time, detects a mark indicating code synchronization of the next digital moving image code, and restarts decoding this digital moving image code.

According to an eighteenth aspect of the present invention, in the moving image quality evaluation determination apparatus, the means for detecting an anomaly of the digital moving image code is a decoder and the decoder detects the presence or the absence of a processing delay of transfer time of the digital moving image code in the network, outputs an error at the detection time of a processing delay, detects a mark indicating code synchronization of the next digital moving image code, and restarts decoding this digital moving image code.

According to a nineteenth aspect of the present invention, in the moving image quality evaluation determination apparatus, the means for detecting an anomaly of the digital moving image code is a display and the display detects an anomaly making it impossible to display on display means for each frame.

According to a twentieth aspect of the present invention, the moving image quality evaluation determination apparatus further includes means for storing the quality evaluation value of the calculation result of the quality degradation degree in the digital moving image every plurality of digital moving images, and means for transmitting the quality evaluation value asynchronously to the digital moving image through the network.

According to a twenty-first aspect of the present invention, the moving image quality evaluation determination apparatus is built in a receiver being connected to the network for receiving the digital moving image.

According to a twenty-second aspect of the present invention, the moving image quality evaluation determination apparatus is built in a repeater being connected to the network for relaying transfer of the digital moving image.

The image area means an image and is an area inside the closed contours on a two-dimensional screen comprising pixels arranged. For example, each hatched portion in squares in FIGS. 2B, 2C, 3B and 3C is one image area. It can be located based on contour or quadrangle apex positions and can also be located by specifying all pixels contained in the area by positions or numbers.

DETAILED DESCRIPTION OF THE PRESENT INVENTION

Figure 1:
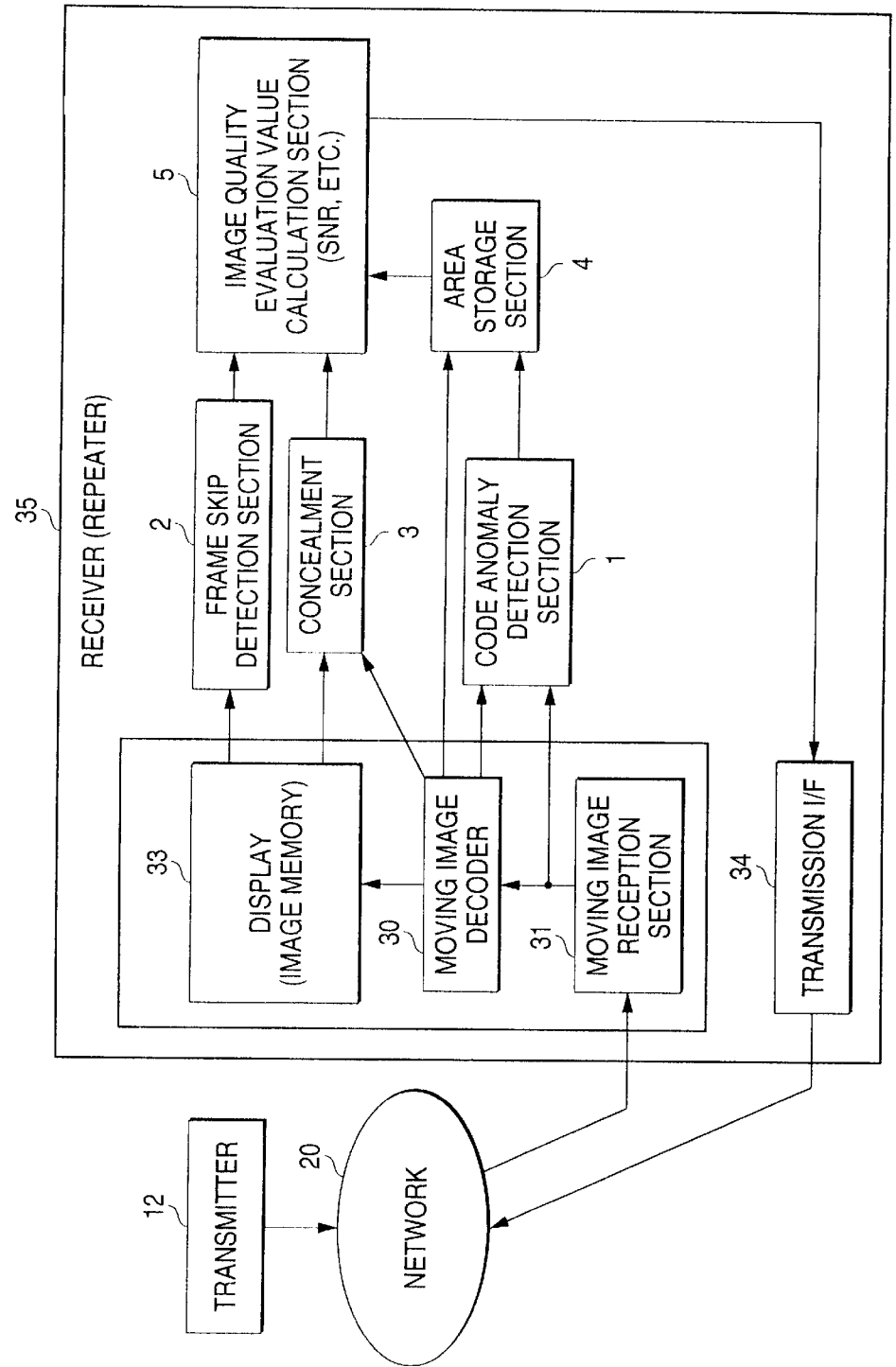
FIG. 1 is a block diagram to show the configuration of a moving image communication quality determination apparatus according to one embodiment of the invention.

Referring now to the accompanying drawings, there is shown a preferred embodiment of the invention. FIG. 1 is a block diagram to show the configuration of a moving image communication quality determination apparatus according to one embodiment of the invention. In the figure, a transmitter 12 and a receiver 35 are connected to a network 20 for transferring data of digital moving image code (simply, moving image code) as a transport packet (simply, packet) between the transmitter 12 and the receiver 35. The transmitter 12 prepares moving image code from moving image data, forms a packet based on the moving image code, and outputs the packet to the network 20. The receiver 35 receives the packet containing the moving image code input via the network 20 at a moving image reception section 31 and calculates the image quality evaluation value of the moving image code.

Figure 5A:
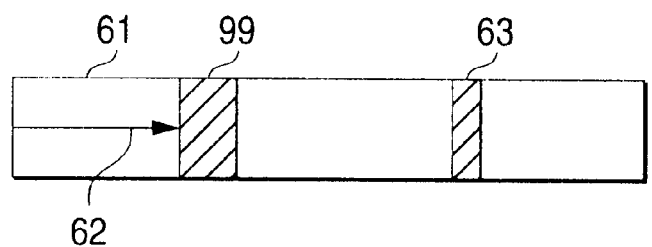
FIGS. 5A and 5B are conceptual drawings to show the format of moving image code.
Figure 5A:
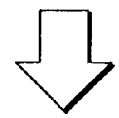
Figure 5B:
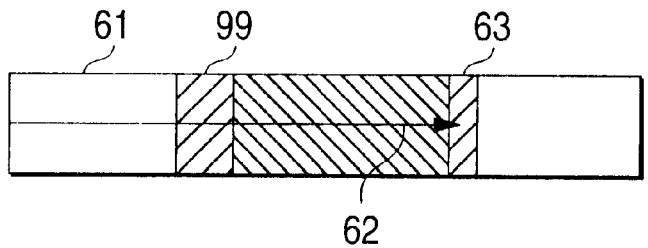

That is, in the transmitter 21, a moving image encoder 10 prepares moving image code from moving image data and outputs the prepared moving image code in the format of a packet to the network 20 via a moving image transmission section 11. In the receiver 35, the moving image reception section 31 receives a packet 61 input via the network 20, extracts the data bits of the moving image code sandwiched between synchronous codes from the received packet (moving image code) 61, and outputs the extracted bits of the moving image code to a moving image decoder 30. Although the synchronous codes are not shown, the bits making up the moving image code of the packet 61 are sandwiched between the synchronous codes like those shown in FIG. 5. The moving image decoder 30 decodes the input moving image code into a digital moving image and outputs the provided digital moving image to a display 33, which then displays the input digital moving image on a display screen.

The transmitter 12 has a function of transmitting moving image code. In the embodiment, the transmitter 12 is similar to the transmitter 112 in the example in the related art. However, in the invention, original image data is not required, thus the transmitter may have any internal configuration. That is, the configuration for storing the moving image code data output to the receiver 35 and the configuration for reading the code image data from that configuration and outputting the data to the outside via the network 20 are not required. The receiver 35 need not have circuitry for acquiring original image data from the transmitter 12 or a transmission/reception interface.

The transmitter 12 transmits moving image code to the receiver 35 via the network 20 as described above. In the configuration of the invention in FIG. 1, if it is necessary to output the image quality evaluation value calculated by the receiver 35 to any other computer, the data containing the image quality evaluation value can be transferred via the network 20 through a transmission I/F 34 asynchronously to moving image code (digital moving image code) The network 20 may be of any configuration, namely, such as a LAN (local area network), a public telephone network, the Internet, or a network connecting the networks mutually, namely, organically.

The receiver 35 may be a personal computer, for example. The moving image reception section 31 separates moving image code from the moving image code, for example, packet 61 input via the network 20 from the transmitter 12 and outputs the separated moving image code to the moving image decoder 30. Further, the moving image decoder 30 detects a transmission error in reception via the network 20 for each input packet 61 and detects the reception time of the packet 61 being late for a predetermined value to detect a signal indicating the presence or absence of an anomaly in the reception state of the packet 61.

The moving image reception section 31 in the personal computer may use a LAN interface or a model interface using a public telephone network, for example. Generally, every interface comprises a transmission error detection function. Thus, a new transmission error detection function need not be designed, developed, or installed to manufacture the apparatus of the invention. The already existing transmission error detection function can be used to input a transmission error signal to the moving image decoder 30.

Further, the moving image decoder 30 outputs the detected transmission error and the detection result of the signal indicating the presence or absence of an anomaly to a code anomaly detection section 1. In addition, the moving image decoder 30 decodes the input image code into image data and outputs the image data to the display 33, which then displays the digital moving image input from the moving image decoder 30 on the display screen. The display 33 needs to store image data at least in frame units for display as the display screen and thus comprises large-capacity image memory. For the image code in the packet 61, the code anomaly detection section 1 detects the anomalous point to its following synchronous code as anomaly code based on the signal indicating the presence or absence of a transmission error and the delay signal.

The code anomaly detection section 1 analyzes normal code in the image code and extracts frame identification code, slice identification code, macro block identification code, block identification code, GOP (Group of Picture or "I frame to point immediately preceding the next I frame") identification code, etc., then records the normal points on the image. Further, if the moving image code is normal, the moving image decoder 30 outputs the moving image data (aggregate of pixels) and writes the moving image code into an area storage section 4. Further, if the moving image decoder 30 has a concealment function, it starts a concealment section 3 if the moving image data is concealed.

When the concealment section 3 is started, it outputs the gradation value of the post-concealed image from the image memory of the display 33 to an image quality evaluation value calculation section 5. Based on a signal indicating that a frame input from the display section 33 is skipped, a frame skip detection section 2 internally stores the fact that the corresponding frame stored in the area storage section 4 is all anomalous, and outputs the fact to the image quality evaluation value calculation section 5, which then regards the portion corresponding to the area stored as anomalous frame in the area storage section 4 as noise, and finds a square sum relative to the anomalous area with the gradation value of the degradation image in the anomalous area set to the minimum value (or 0). This processing operation will be discussed later in detail.

Further, in the configuration of the invention shown in FIG. 1, the moving image decoder 30 and the display 33 may not be provided. In this case, only the code anomaly detection section 1 inputs the moving image code output from the moving image reception section 31. In addition, the code anomaly detection section 1 may input the signal indicating the presence or absence of a transmission error of the packet 61 detected by the moving image reception section 31. Alternatively, the code anomaly detection section 1 may input the delay signal of the reception time of the packet 61 from the moving image reception section 31.

The code anomaly detection section 1 detects the anomalous point to its following synchronous code in the packet 61 as anomaly code based on the signal indicating the presence or absence of a transmission error and the delay signal. The code anomaly detection section 1 analyzes normal code in the image code and extracts frame identification code, slice identification code, macro block identification code, block identification code, GOP (Group of Picture or "I frame to point immediately preceding the next I frame") identification code, etc., then records the normal points on the image. The reason why the normal points on the image are recorded is that since the moving image decoder 30 is not provided and the moving image code cannot be decoded, it is impossible to record for each pixel. The normal points are recorded in the area storage section 4.

All or any of the identification codes may be extracted. The area concerning the identification code with the finest unit among the extracted identification codes may be used as a unit. The image quality evaluation value calculation section 5 references the storage information in the area storage section 4 and from the recorded normal areas, regards other areas as anomalous areas or causes the anomaly signal of a transmission error, etc., detected by the moving image reception section 31 to be input to the code anomaly detection section 1.

The code anomaly detection section 1 regards the image area corresponding to from the immediately preceding identification code detecting the anomaly signal to the immediately following identification code among the extracted identification codes as an anomalous area and records the area in the area storage section 4. If a transmission error or delay is detected in packet units, all codes contained in one packet are made invalid. That is, to discard the codes contained in one packet, for each packet discard, the corresponding image area is recorded in the area storage section 4.

For example, assume that two frames are recorded as anomalous area in one packet discard and that seven blocks are discarded as anomalous area in another packet discard. The image quality evaluation value calculation section 5 references the area storage section 4 counts the number of anomalous GOPs relative to the total number of GOPs as GOP loss rate, the number of anomalous frames relative to the total number of frames as frame loss rate, the number of anomalous slices relative to the total number of slices as slice loss rate, the number of anomalous macro blocks relative to the total number of macro blocks as macro block loss rate, and the number of anomalous blocks relative to the total number of blocks as block loss rate in record units and larger units and performs operation on the count results, thereby finding an image quality evaluation value. In this case, the image quality evaluation value is calculated from the moving image reception section 31, the code anomaly detection section 1, the area storage section 4, and the image quality evaluation value calculation section 5 even if the moving image decoder 30 for restoring the gradation value of the original pixels is not provided.

Figure 2A:
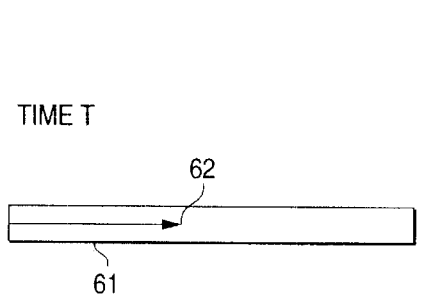
FIGS. 2A–2C are conceptual drawings to describe the format of data stored in an area storage section 4 in the moving image communication quality determination apparatus in FIG.
Figure 2B:
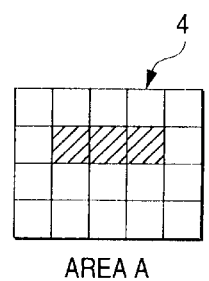

Next, an operation example of the embodiment of the invention will be discussed with reference to FIGS. 1 to 3C. FIGS. 2A–2C and 3A–3C are conceptual drawings to show a storage method of anomalous areas in the area storage section 4. Each of FIGS. 2A and 3A is a conceptual drawing of motion of a pointer and Each of FIGS. 2B, 2C, 3B and 3C is a conceptual drawing of small areas pointed to by the pointer. The area storage section 4 is previously allocated internally so as to store normality or anomaly for each frame, slice, macro block, or block as the above-mentioned small area identified by frame identification code, slice identification code, macro block identification code, block identification code, GOP (Group of Picture or "I frame to point immediately preceding the next I frame") identification code.

The grid pattern in each of FIGS. 2B, 2C, 3B and 3C is, for example, a memory map and a memory bit may be assigned to one square. For normality, "0" is stored and for anomaly, "1" is stored. Alternatively, two memory bits are assigned to one square, so that for normality, "01" is stored; for anomaly, "11" is stored; for the square not yet read by the code pointer, "00" is stored.

Alternatively, without storing normality or anomaly for each frame, slice, macro block, block, or GOP, the maximum and minimum values of the column and row numbers of rectangular area cut out on the display screen of the display 33 may be stored as the anomalous areas indicating method. Here, the smallest rectangle in area A, area B in FIGS. 2B, 2C, 3B and 3C corresponds to the above-mentioned small area.

Figure 2C:
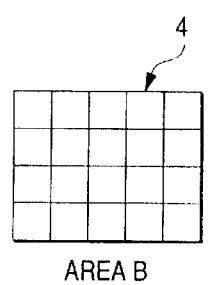
Figure 3A:
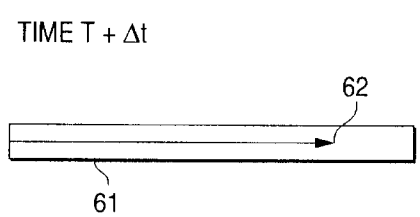
FIGS. 3A–3C are conceptual drawings to describe the format of data stored in the area storage section 4 in the moving image communication quality determination apparatus in FIG. 1.
Figure 3B:
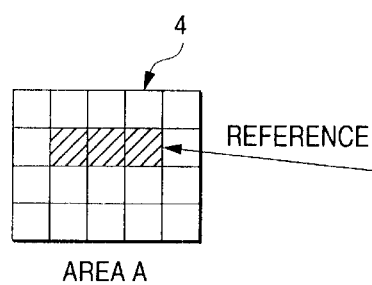
Figure 3C:
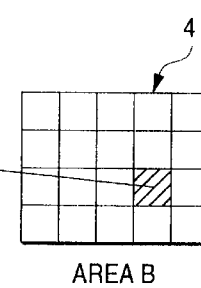
Figure 4:
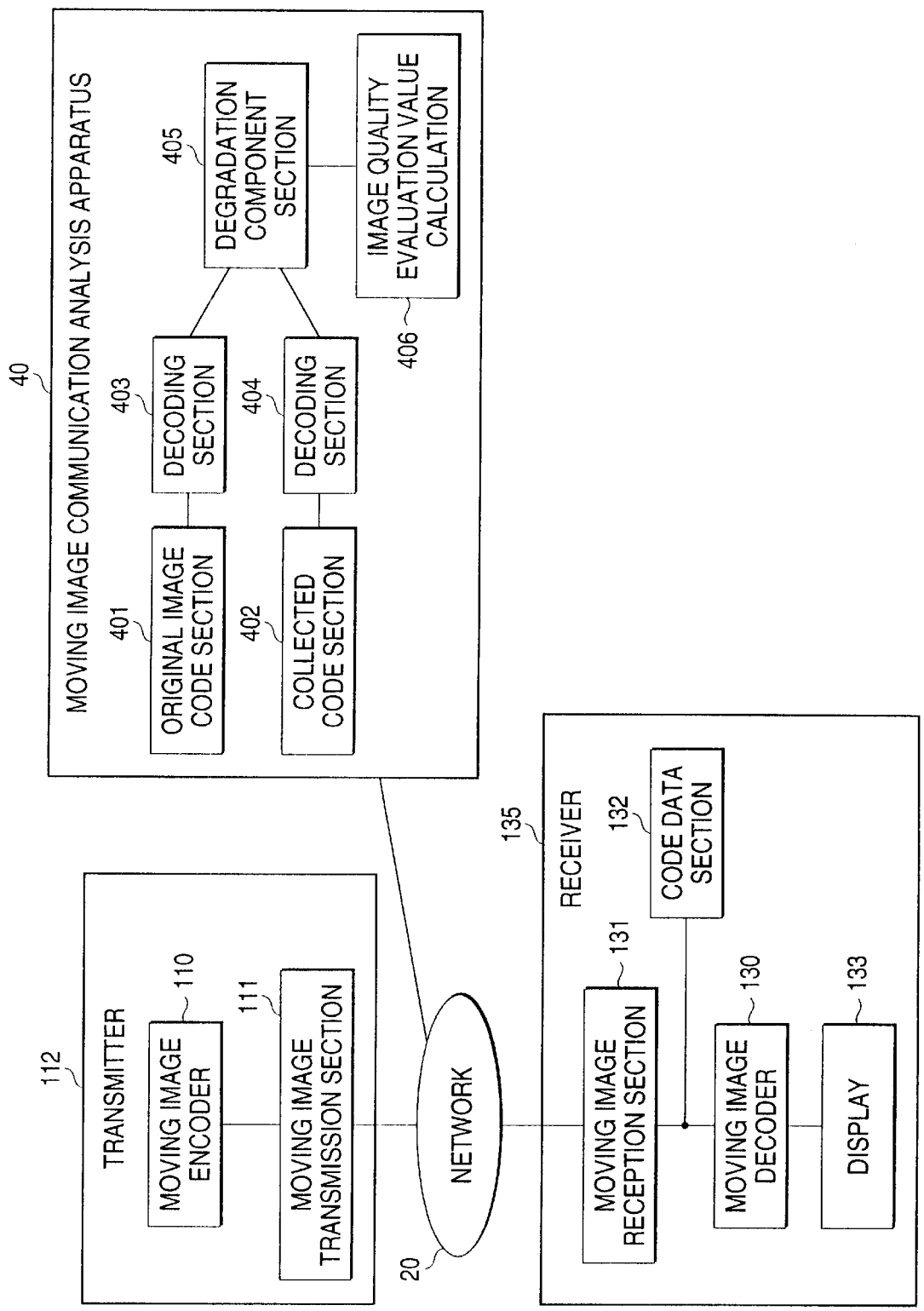
FIG. 4 is a block diagram to show the configuration of an image processing system containing a moving image communication analysis apparatus according to an example in a related art.

For example, assume that hatched areas are stored as anomaly and blank areas are stored as normality in the areas A and B separated like grids in FIGS. 2B, 2C, 3B and 3C. Here, it is also possible to analyze the fact that a part of the code in the area A of FIG. 3B references a predetermined portion of the area B of FIG. 3C as shown in FIGS. 3B and 3C (in the prediction coding technique, etc.,). To analyze the reference, the spread of an anomalous area to other areas in the prediction coding technique can be evaluated.

At time T, the moving image reception section 31 detects an anomaly for the area A to the point of the moving image code 61 pointed to by the code pointer 62 in FIG. 2A. The anomalous area to the time is shown in the right area A of FIG. 2B. At this time, the small area that is not a normal area is regarded as a loss of moving image code and is stored in the area storage section as an anomalous area.

Next, at time T+Δt, as shown in FIGS. 3A–3C, the moving image reception section 31 detects the fact that anomaly detection advances to the area B from the point pointed to by the code pointer 62 in FIG. 2C and that the small area hatched in the area B of FIG. 3C references a specific point of the area A of FIG. 3B. At this time, the moving image reception section 31 also stores the small area in the area B as anomaly because the referenced area in the area A is anomalous even if the code pointed to by the code pointer 62 is normal.

The described processing is performed for each unit of frame identification code, slice identification code, macro block identification code, block identification code, GOP (Group of Picture or "I frame to point immediately preceding the next I frame") identification code in which the referencing to referenced relationship in prediction coding runs out. For example, in the above-mentioned international standard MPEG, detection of an anomaly is executed to the end of Group of Pictures (GOP). Then, upon completion of the calculation and storage processing of the image quality evaluation value, the image quality evaluation value calculation section 5 can also release the area storage section 4 for use to advance processing to the next similar code unit.

At this time, if the receiver 35 contains the moving image decoder 30, the moving image decoder 30 decodes the image code into moving image data and outputs the moving image data to the display 33. Thus, the display 33 needs to store the image data in a number of frames and is provided with sufficient-capacity image memory. For example, the image memory may have a capacity capable of storing one GOP. If the moving image code is normal, the moving image decoder 30 records the moving image code in the area storage section 4 as a normal area in addition to the above-mentioned operation. At this time, in the area storage section 4, small areas may be pixel units. As previously shown in the description of the configuration, the small areas may be frame, slice, macro block, block, or GOP units.

On the other hand, when the moving image decoder 30 detects the fact that the moving image code is not predetermined code in decoding processing, it discards the detected anomalous code portion of the moving image code. At this time, the moving image decoder 30 stores the anomalous area in the area storage section 4. The possible causes of encountering unpredetermined code are as follows: The moving image encoder 30 or the transmitter 30 is faulty; a transmission error occurs and error correction code is not used or the error exceeds the correction capability; an error is mixed after error correction; packet 61 is discarded because of transmission error detection and bits not concatenated if normal are contiguous; and the like. At the termination of decoding a unit area, the code anomaly detection section 1 stores small areas not stored in the area storage section 4 as normality in the area storage section 4 as anomaly.

As described above, usually the moving image decoder 30 performs specific processing determined at the design time of the moving image decoder 30 as provision for input of unpredetermined code. For example, the moving image decoder 30 sends a signal to an external circuit or program. The code anomaly detection section 1 may input a signal indicating that such specific processing is entered. In this case, the moving image decoder 30 outputs the area of the image provided by decoding to the area storage section 4, whereby detection of an anomaly and a normal image area resulting from decoding can be known and the invention can be embodied comparatively easily.

If the decoding completion of a frame is not in time for the display time in the moving image decoder 30 or if the moving image decoder 30 stops decoding a specific frame and starts to decode the next frame, the frame is not decoded and is not displayed; such a state is called frame skip. When the display section 33 detects the frame skip, it outputs a frame skip detection signal to the frame skip detection section 2.

The frame skip detection section 2 may monitor the update timing of frame display of the display section 33 and detect a frame skip from a time interval anomaly. When the frame skip is detected, the code anomaly detection section 1 stores the corresponding frame in the area storage section 4 as anomaly.

Next, if the moving image decoder 30 has a concealment function (of anomalous image data), it detects occurrence of concealment as a code anomaly. The moving image decoder 30 stores the concealment area in the area storage section 4 as an anomalous area in a similar manner to that described above.

The units of small areas in the area storage section 4 may be preselected appropriately from among pixel, block, macroblock, slice, frame, GOP units, etc., as described above. The larger the units, the smaller the memory capacity. If an anomaly of one point is detected, processing advances to the next small area, and the anomaly detection processing amount is lessened. Further, for example, in MPEG, the top code of the next frame is synchronous code, so that it is also easy to find frame separation.

By the way, the image quality evaluation value calculation section 5 calculates the image quality evaluation value for each corresponding small area based on various data pieces of the frame skip section 2, the concealment section 3, and the area storage section 4. Here, two types of image quality evaluation values and methods of finding the image quality evaluation values will be discussed. The first type of image quality evaluation value is represented by the size of anomalous areas on the display screen displaying image data.

That is, upon completion of detection to a code unit point, for example, the end of GOP, the image quality evaluation value calculation section 5 counts the number of anomalous small areas stored in the area storage section 4. The image quality evaluation value calculation section 5 adopts the first image quality evaluation value as the ratio between the count of the anomalous small areas and the total number of small areas in the corresponding units. The first image quality evaluation value represents the area size of an anomalous portion as the image. According to the small area units, the units for calculating the area size ratio also become pixel, block, macro block, slice, frame, or GOP units.

The second type of image quality evaluation value is represented by so-called SNR (signal to noise ratio). Since the SNR, the second image quality evaluation value, has been frequently used, the user is easily familiar with it as an evaluation value. For the image quality evaluation value calculation section 5 to calculate the SNR, the fact that the units of small areas are pixels becomes a scale easily familiar with the conventional SRN. Hitherto, the SRN has been calculated in the following two manners:

The first method, called PSNR (peak SNR), is a method of finding the amplitude ratio between the average square value of noise and the total amplitude. For example, if the calculation value is represented in eight bits, the total amplitude is 255.

The other method, called SNR, is a method of finding the ratio between the square sum of noise and the square sum of reference signal.

In either way, the portion corresponding to each area stored as anomaly in the area storage section 4 is regarded as noise, the gradation value of the degradation image in the anomalous area is set to black (minimum value or zero), and the square sum is found only for the anomalous area. Further, in this case, two methods of assuming the gradation value of a reference value are available.

The first reference image is assumed to be the median of the total amplitude of gradation. As the second reference image, a copy is made from the same position, etc., in the contiguous block or the contiguous frame by concealment, the gradation value of the image is corrected, and the image is assumed to be (used as) the reference image. Here, the second reference image is corrected with the gradation value of the post-concealed image data by the concealment section 3 from the image memory of the display 33, then input to the image quality evaluation value calculation section 5.

As the image quality evaluation value thus calculated in the image quality evaluation value calculation section 5, in the typical case, one numeric value is provided for a code unit, for example, GOP in MPEG as described above. For example, if GOP consists of 15 frames at a frame rate of 30 frames per second, only 30 numeric values as the image quality evaluation values are provided for a 15-second moving image. Thus, the information amount of the image quality evaluation values is order-of-magnitude smaller than the original digital moving image data amount, the moving image code amount, etc., in the corresponding image range.

Therefore, a personal computer having a storage capacity exceeding several gigabytes makes it possible with no problem to calculate the image quality evaluation values for an extremely large number of moving image data pieces or long-duration moving image data and store all evaluation values.

That is, the data amount of the image quality evaluation values is order-of-magnitude smaller than the moving image code amount, so that the image quality evaluation value need not be sent each time it is calculated or that the image quality evaluation values need not be sent each time a specific number of the image quality evaluation values are calculated. Therefore, this advantage eliminates the need for the operation required for storing the image quality evaluation value, namely, the operation of transmitting moving image code in real time from the transmitter 12 to the receiver 35, next calculating the image quality evaluation value, then immediately accessing another computer, for example, by the receiver 35 and sending the image quality evaluation value within several milliseconds for releasing the storage area. Upon reception of a request from another computer, the receiver 35 may send the image quality evaluation value. It is not necessary to calculate and send the image quality evaluation value in synchronization, namely, on predetermined schedule, so that the image quality evaluation value may be sent asynchronously if the sending timing is after the image quality evaluation value is calculated.

Thus, if a management computer (not shown) at a distant location from the receiver 35 gathers the image quality evaluation values from the image quality evaluation value calculation section 5, it can easily gather the image quality evaluation values by a commonplace transmission method including electronic mail via the network 20. Communication between the receiver 35 and the management computer can also be conducted using a time period such as the night hours at a low charge for reducing the communication costs if the user is billed by the connection time or the data amount.

In the description of the embodiment made so far, the image quality evaluation value calculation section 5 in the moving image communication quality determination apparatus according to the embodiment is built in the receiver 35 comprising the moving image decoder 30 and the display 33; in addition, it can also be built in a repeater for relaying transfer of moving image code. The moving image code received by the repeater is evaluated in a similar manner to that of evaluating the moving image code received by the receiver. In addition, according to the moving image communication quality determination apparatus of the invention, to evaluate the moving image code output by the repeater, performance, fault, and the like of the repeater can be monitored and the moving image quality at the fault occurrence time can be analyzed.

Having described the invention as related to the embodiment shown in the accompanying drawings, the invention is not limited to the specific embodiment and various changes in the shape, size, and arrangement of parts may be resorted to without departing from the spirit of the invention.

According to the first aspect of the invention, there is provided, in a moving image communication system comprising a network and a moving image server connected to the network wherein the moving image server transmits digital moving image code via the network, a moving image quality evaluation determination apparatus comprising means being connected to the network for receiving the digital moving image code, means being connected to the network for detecting an anomaly of the digital moving image code, and image quality evaluation value calculation means being connected to the network for calculating the degree of quality degradation in a digital moving image caused by the detected anomaly. Thus, the original image or a moving image for comparison formerly required become unnecessary, the components for transferring the original image, namely, a transmission section, a reception section, and a transmission line become unnecessary, the communication costs (in a chargeable network) are free, and the need for transferring the degraded moving image code on which an evaluation is to be conducted is eliminated. In addition, the image quality evaluation values are transferred and the image quality evaluation value transfer amount is order-of-magnitude smaller than the original image transfer amount, so that the image quality after the moving image code is transmitted can be evaluated more easily at low costs.

According to the second aspect of the invention, the receiving means comprises means for decoding a portion of the digital moving image code not containing the detected anomaly into a digital moving image. Thus, a portion containing an anomaly and a portion containing no anomaly are detected clearly, so that a position as an image (digital moving image) and its gradation value are provided and the image quality evaluation value as an image (for example, area size ratio between the anomalous area and the whole area, SNR, etc.,) is provided.

According to the third aspect of the invention, the anomaly detecting means detects a transmission error of the digital moving image code in the network and discard of the digital moving image code as the anomaly of the digital moving image code. Thus, image degradation when the digital moving image code is not decoded can be evaluated without the need for the original image in bit-length units for detecting a transmission error or bit-length units where discard occurs.

According to the fourth aspect of the invention, the anomaly detecting means detects a transmission time delay of the digital moving image code in the network as the anomaly of the digital moving image code. Thus, at the transmission time in the network, image degradation when the delayed moving image code is not decoded can be evaluated without the need for the original image.

According to the fifth aspect of the invention, the anomaly detecting means detects the fact that the digital moving image code to be decoded by the means for decoding the code into a digital moving image is not predetermined digital moving image code as the anomaly of the digital moving image code. Thus, image degradation caused by undetermined or uncorrected moving image code can be evaluated without the need for the original image.

According to the sixth aspect of the invention, when in decoding a specific part of the digital moving image code, the decode value of a different portion is referenced, the anomaly detecting means detects an anomaly of the decode value of the different part spreading to the decode value of the specific part of the digital moving image code as the anomaly of the digital moving image code. Thus, image degradation in the prediction coding technique can be evaluated without the need for the original image.

According to the seventh aspect of the invention, the moving image quality evaluation determination apparatus further includes means for locating an image area corresponding to the detected anomaly in the digital moving image, wherein the image quality evaluation value calculation means outputs the size of the anomalous image area or a size ratio of the anomalous image area to the whole as the calculation result. Thus, the image degradation degree as the image quality evaluation value can be evaluated extremely easily and the coding and transmission conditions may be selected as conditions for minimizing the area size ratio, so that condition selection and design become extremely easy as compared with those of complicated image quality evaluation values.

According to the eighth aspect of the invention, the image quality evaluation value calculation means calculates the size of the anomalous image area or a size ratio of the anomalous image area to the whole in pixel units of the digital moving image. Thus, if anomalous areas are complicated finely, the size (degree) of the anomalous areas can be accurately evaluated comparatively easily.

According to the ninth aspect of the invention, the image quality evaluation value calculation means calculates the size of the anomalous image area or a size ratio of the anomalous image area to the whole in units of small areas into which a screen is divided in a specific range. Thus, for example, to adopt slice units, macro block units, or block units used in the international standards shown in the related art, if an anomaly is detected in the small areas, immediately the corresponding area can be determined an anomalous area and a move can be made to detection of the next small area, so that processing becomes extremely easy and moving image code is discarded from decoding until the next code becomes normal after the anomaly is detected, thus whether or not the moving image code is to be discarded can be determined easily for each small area. If it is not necessary to provide a delicate difference as the image quality evaluation value depending on the purpose of image quality evaluation although the evaluation value accuracy is coarse, sufficient accuracy as the image quality evaluation value is provided and processing of image quality evaluation can be simplified drastically.

According to the tenth aspect of the invention, the image quality evaluation value calculation means calculates the size of the anomalous image area or a size ratio of the anomalous image area to the whole in displayed frame units. Thus, if an anomaly is detected in a frame, immediately the frame can be determined an anomalous frame and a move can be made to detection of the next frame, so that processing becomes extremely easy and code is discarded from decoding until the next decoding becomes normal after the anomaly is detected when the moving image code is decoded, thus whether or not the moving image code is to be discarded can be determined easily for each frame and further the display can easily determine whether or not a specific frame is to be discarded. If it is not necessary to provide a delicate difference as the image quality evaluation value depending on the purpose of image quality evaluation although the evaluation value accuracy is coarse, sufficient accuracy as the image quality evaluation value is provided and processing of image quality evaluation can be simplified drastically.

According to the eleventh aspect of the invention, the image quality evaluation value calculation means sets the gradation value of the anomalous image area detected by the means for locating an image area corresponding to the detected anomaly in the digital moving image to zero, calculates a first square sum of the gradation value of the anomalous image area and a second square sum of the gradation values of the whole, calculates a ratio between the first and second square sums, and outputs the calculation result as an image evaluation value. Thus, when the degradation component is assumed to be noise, so-called SNR value can be provided and it is easy to deal with the conventional evaluation values. If the gradation value is represented by a fixed-point or fixed-bit-length integer value as the digital moving image code format, if the second square sum is the sum total over the whole of the squares of the maximum amplitude that the gradation value can take, the evaluation value called PSNR (peak SNR) is provided and it becomes easy to deal with the conventional evaluation values, needless to say.

According to the twelfth aspect of the invention, the image quality evaluation value calculation means corrects by concealment the gradation value of the anomalous image area detected by the means for locating an image area corresponding to the detected anomaly in the digital moving image, calculates a first square sum of the gradation value of the anomalous image area corrected and a second square sum of the gradation values of the whole, calculates a ratio between the first and second square sums, and outputs the calculation result as an image evaluation value. Thus, if the degradation component is assumed to be noise, so-called SNR value can be provided and moreover the quality evaluation value close to an image at a reception terminal using concealment (displayed image) is provided.

According to the thirteenth aspect of the invention, when in decoding a specific part of the digital moving image code, the decode value of a different portion is referenced, the anomaly detecting means detects an anomaly of the decode value of the different part spreading to the decode value of the specific part of the digital moving image code based on the code corresponding to the detected anomaly and the means for locating an image area corresponding to the detected anomaly in the digital moving image locates the image area containing the specific part of the digital moving image code corresponding to the spreading anomaly. Thus, to evaluate the moving image code in the prediction coding technique, an anomaly of reference value can be stored, so that an anomaly of decode value can be detected in the same order as decoding and complicity of processing in the reverse code order is eliminated.

According to the fourteenth aspect of the invention, the means for locating an image area corresponding to the detected anomaly in the digital moving image comprises a storage section allocated in a fixed length of one bit or more per pixel and records the anomalous area in the storage section. Thus, after processing, an anomalous are can be easily determined and to evaluate the moving image code in the prediction coding technique, spread of a reference value anomaly to each pixel can be stored, so that an anomaly of decode value can be detected in the same order as decoding for locating an anomalous area in pixel units and complicity of processing in the reverse code order is eliminated.

According to the fifteenth aspect of the invention, the means for locating an image area corresponding to the detected anomaly in the digital moving image comprises a storage section allocated in a fixed length of one bit or more per small area into which a display screen is previously divided and records the anomalous area in the storage section. Thus, after processing, an anomalous are can be easily determined and to evaluate the moving image code in the prediction coding technique, spread of a reference value anomaly to each small area can be stored, so that an anomaly of decode value can be detected in the same order as decoding for locating an anomalous area in small area units and complicity of processing in the reverse code order is eliminated; the memory amount used in the processing can be lessened as compared with the determination in pixel units.

According to the sixteenth aspect of the invention, the means for locating an image area corresponding to the detected anomaly in the digital moving image specifies a rectangular area on a display screen and records maximum and minimum values of column and row numbers of the rectangular area on the display screen. Thus, after processing, an anomalous are can be easily determined and to evaluate the moving image code in the prediction coding technique, spread of a reference value anomaly to each rectangular area can be stored, so that an anomaly of decode value can be detected in the same order as decoding for locating an anomalous area in rectangular area units and complicity of processing in the reverse code order is eliminated; the memory amount used in the processing can be lessened as compared with the determination in pixel units.

According to the seventeenth aspect of the invention, the means for detecting an anomaly of the digital moving image code is a decoder and the decoder detects input digital moving image code being undecodable, outputs an error at the detection time, detects a mark indicating code synchronization of the next digital moving image code, and restarts decoding this digital moving image code. Thus, any portion other than the decoded image area can be determined to be anomalous.

According to the eighteenth aspect of the invention, the means for detecting an anomaly of the digital moving image code is a decoder and the decoder detects the presence or the absence of a processing delay of transfer time of the digital moving image code in the network, outputs an error at the detection time of a processing delay, detects a mark indicating code synchronization of the next digital moving image code, and restarts decoding this digital moving image code. Thus, any portion other than the decoded image area can be determined to be anomalous.

According to the nineteenth aspect of the invention, the means for detecting an anomaly of the digital moving image code is a display and the display detects an anomaly making it impossible to display on display means for each frame. Thus, an event displayed with a frame skipped can be recorded, so that the quality evaluation value close to an image at a reception terminal (displayed image) is provided.

According to the twentieth aspect of the invention, the moving image quality evaluation determination apparatus further includes means for storing the quality evaluation value of the calculation result of the quality degradation degree in the digital moving image every plurality of digital moving images, and means for transmitting the quality evaluation value asynchronously to the digital moving image through the network. Thus, the computer for calculating the quality evaluation value can use a normal transmission function such as a mail transmission function to output the image quality evaluation value.

According to the twenty-first aspect of the invention, the moving image quality evaluation determination apparatus is built in a receiver being connected to the network for receiving the digital moving image. Thus, to build the apparatus in the user's reception terminal, the moving image quality used with the terminal can be evaluated with accuracy as compared with installation of a dedicated moving image communication quality determination machine.

According to the twenty-second aspect of the invention, the moving image quality evaluation determination apparatus is built in a repeater being connected to the network for relaying transfer of the digital moving image. Thus, performance, failure, etc., of the repeater concerning the image quality can be evaluated as compared with installation of a dedicated moving image communication quality determination machine.

What is claimed is:

1. A moving image quality evaluation determination apparatus used in a moving image communication system including a network and a moving image server connected to the network, the moving image server for transmitting digital moving image code via the network, the moving image quality evaluation determination apparatus comprising:

receiving means connected to the network, the receiving means for receiving the digital moving image code;

anomaly detecting means connected to the network, the detecting means for detecting an anomaly of the digital moving image code; and image quality evaluation value calculation means connected to the network, the image quality evaluation value calculation means for calculating the degree of quality degradation in a digital moving image caused by the detected anomaly.

2. The moving image quality evaluation determination apparatus as claimed in claim 1 wherein the receiving means comprises decoding means for decoding a portion of the digital moving image code not containing the detected anomaly into a digital moving image.

3. The moving image quality evaluation determination apparatus as claimed in claim 2 wherein the anomaly detecting means detects the fact that the digital moving image code to be decoded by the decoding means is not predetermined digital moving image code as the anomaly of the digital moving image code.

4. The moving image quality evaluation determination apparatus as claimed in claim 2 wherein when in decoding a specific part of the digital moving image code, the decode value of a different portion is referenced, the anomaly detecting means detects an anomaly of the decode value of the different part spreading to the decode value of the specific part of the digital moving image code as the anomaly of the digital moving image code.

5. The moving image quality evaluation determination apparatus as claimed in claim 1 wherein the anomaly detecting means detects a transmission error of the digital moving image code in the network and discard of the digital moving image code as the anomaly of the digital moving image code.

6. The moving image quality evaluation determination apparatus as claimed in claim 1 wherein the anomaly detecting means detects a transmission time delay of the digital moving image code in the network as the anomaly of the digital moving image code.

7. The moving image quality evaluation determination apparatus as claimed in claim 1 further comprising means for locating an image area corresponding to the detected anomaly in the digital moving image, wherein the image quality evaluation value calculation means outputs the size of the anomalous image area or a size ratio of the anomalous image area to the whole as the calculation result.

8. The moving image quality evaluation determination apparatus as claimed in claim 7 wherein the image quality evaluation value calculation means sets the gradation value of the anomalous image area detected by the means for locating an image area corresponding to the detected anomaly in the digital moving image to zero, calculates a first square sum of the gradation value of the anomalous image area and a second square sum of the gradation values of the whole, calculates a ratio between the first and second square sums, and outputs the calculation result as an image evaluation value.

9. The moving image quality evaluation determination apparatus as claimed in claim 7 wherein the image quality evaluation value calculation means corrects by concealment the gradation value of the anomalous image area detected by the means for locating an image area corresponding to the detected anomaly in the digital moving image, calculates a first square sum of the gradation value of the anomalous image area corrected and a second square sum of the gradation values of the whole, calculates a ratio between the first and second square sums, and outputs the calculation result as an image evaluation value.

10. The moving image quality evaluation determination apparatus as claimed in claim 7 wherein when in decoding a specific part of the digital moving image code, the decode value of a different portion is referenced, the anomaly detecting means detects an anomaly of the decode value of the different part spreading to the decode value of the specific part of the digital moving image code based on the code corresponding to the detected anomaly and wherein the means for locating an image area corresponding to the detected anomaly in the digital moving image locates the image area containing the specific part of the digital moving image code corresponding to the spreading anomaly.

11. The moving image quality evaluation determination apparatus as claimed in claim 7 wherein the means for locating an image area corresponding to the detected anomaly in the digital moving image comprises a storage section allocated in a fixed length of one bit or more per pixel and records the anomalous area in the storage section.

12. The moving image quality evaluation determination apparatus as claimed in claim 7 wherein the means for locating an image area corresponding to the detected anomaly in the digital moving image comprises a storage section allocated in a fixed length of one bit or more per small area into which a display screen is previously divided and records the anomalous area in the storage section.

13. The moving image quality evaluation determination apparatus as claimed in claim 7 wherein the means for locating an image area corresponding to the detected anomaly in the digital moving image specifies a rectangular area on a display screen and records maximum and minimum values of column and row numbers of the rectangular area on the display screen.

14. The moving image quality evaluation determination apparatus as claimed in claim 1 wherein the image quality evaluation value calculation means calculates the size of the anomalous image area or a size ratio of the anomalous image area to the whole in pixel units of the digital moving image.

15. The moving image quality evaluation determination apparatus as claimed in claim 1 wherein the image quality evaluation value calculation means calculates the size of the anomalous image area or a size ratio of the anomalous image area to the whole in units of small areas into which a screen is divided in a specific range.

16. The moving image quality evaluation determination apparatus as claimed in claim 1 wherein the image quality evaluation value calculation means calculates the size of the anomalous image area or a size ratio of the anomalous image area to the whole in displayed frame units.

17. The moving image quality evaluation determination apparatus as claimed in claim 1 wherein the anomaly detecting means is a decoder and wherein the decoder detects input digital moving image code being undecodable, outputs an error at the detection time, detects a mark indicating code synchronization of the next digital moving image code, and restarts decoding this digital moving image code.

18. The moving image quality evaluation determination apparatus as claimed in claim 1 wherein the anomaly detecting means is a decoder and wherein the decoder detects presence or absence of a processing delay of transfer time of the digital moving image code in the network, outputs an error at the detection time of a processing delay, detects a mark indicating code synchronization of the next digital moving image code, and restarts decoding this digital moving image code.

19. The moving image quality evaluation determination apparatus as claimed in claim 1 wherein the anomaly detecting means is a display and wherein the display detects an anomaly making it impossible to display on display means for each frame.

20. The moving image quality evaluation determination apparatus as claimed in claim 1 further comprising:

means for storing the quality evaluation value of the calculation result of the quality degradation degree in the digital moving image every plurality of digital moving images; and means for transmitting the quality evaluation value asynchronously to the digital moving image through the network.

21. The moving image quality evaluation determination apparatus as claimed in claim 1 being incorporated in a receiver being connected to the network for receiving the digital moving image.

22. The moving image quality evaluation determination apparatus as claimed in claim 1 being incorporated in a repeater being connected to the network for relaying transfer of the digital moving image.

* * * * *